United States Patent [19]

Sinfelt

[11] 3,953,368

[45] Apr. 27, 1976

[54] POLYMETALLIC CLUSTER COMPOSITIONS USEFUL AS HYDROCARBON CONVERSION CATALYSTS

[75] Inventor: John H. Sinfelt, Berkeley Heights, N.J.

[73] Assignee: Exxon Research and Engineering Co., Linden, N.J.

[22] Filed: July 30, 1974

[21] Appl. No.: 493,105

Related U.S. Application Data

[63] Continuation-in-part of Ser. No. 194,461, Nov. 1, 1971, Pat. No. 3,850,747, which is a continuation-in-part of Ser. No. 883,601, Dec. 9, 1969, abandoned.

[52] U.S. Cl. ........................ 252/466 PT; 252/439; 252/441; 252/474; 208/138; 208/139
[51] Int. Cl.$^2$ .................... B01J 21/04; B01J 23/42; B01J 23/46
[58] Field of Search ...................... 252/466 A, 474; 208/138, 139

[56] References Cited
UNITED STATES PATENTS

| | | | |
|---|---|---|---|
| 2,848,377 | 8/1958 | Webb | 208/138 X |
| 2,911,357 | 11/1959 | Myers et al. | 208/138 |

FOREIGN PATENTS OR APPLICATIONS

| | | | |
|---|---|---|---|
| 1,108,361 | 6/1961 | Germany | 208/138 |

*Primary Examiner*—W. J. Shine
*Attorney, Agent, or Firm*—J. E. Luecke; Jay Simon

[57] ABSTRACT

Compositions comprising iridium and at least one additional metal, preferably platinum, are disclosed in which the iridium and the additional metal or metals are present on a refractory support as highly dispersed polymetallic clusters. The metallic atoms in a cluster are separated by distances of about 2.5 to 4.0A. The degree of coverage of the surface of said refractory support by said polymetallic clusters is lower than about 10% and frequently lower than about 1%. The compositions are useful as hydrocarbon conversion catalysts, and iridiumplatinum catalysts containing a halogen moiety are especially useful for promoting naphtha reforming reactions.

19 Claims, 5 Drawing Figures

FERROMAGNETIC MÖSSBAUER SPECTRA OF SAMPLES B, C AND D

MÖSSBAUER SPECTRA OF SAMPLES CALCINED IN AIR AT 600°C

MÖSSBAUER SPECTRA OF SEQUENTIALLY IMPREGNATED SAMPLES REDUCED FOR 1 HR AT 500°C

3,953,368

POLYMETALLIC CLUSTER COMPOSITIONS USEFUL AS HYDROCARBON CONVERSION CATALYSTS

CROSS-REFERENCES TO RELATED APPLICATIONS

This application is a continuation-in-part of co-pending application Ser. No. 194,461, filed Nov. 1, 1971, now U.S. Pat. No. 3,850,747, which in turn is a continuation-in-part of application, Ser. No. 883,601, filed Dec. 9, 1969, and now abandoned.

BACKGROUND OF THE INVENTION

1. Field of the Invention

This invention relates to supported iridium-containing catalysts which find effective use in hydrocarbon conversion processes. More particularly, this invention relates to improved supported, polymetallic, iridium-containing hydrocarbon conversion catalysts, particularly useful in naphtha reforming processes.

2. Description of the Prior Art

The existence of iridium-containing hydrocarbon conversion catalysts has been reported in the patent literature. Webb et al., in U.S. Pat. No. 2,848,377, disclose that supported iridium/platinum metal combinations are effective hydrocarbon conversion catalysts. Sinfelt et al., in U.S. Pat. NO. 3,567,625, teach that combinations of iridium with Group IB metals are effective hydroforming catalysts. Koberstein, in German Pat. No. 1,108,361, teaches that supported platinum catalysts containing minor amounts of iridium can be employed to reform heavy petroleum fractions. Brodbeck, in U.S. Pat. No. 3,538,174, teaches that supported platinum/iridium compositions can be employed in the isomerization of $C_8$ alkyl aromatics. It has been disclosed in U.S. Pat. No. 3,534,110, French Pat. No. 1,567,900 and in Netherlands application No. 70,04770 that cyclohexanol and/or cyclohexanone can be dehydrogenated to phenol and that saturated hydrocarbons can be dehydrogenated to olefins by contact with a supported iridium-containing catalyst that also contains an additional alkali or alkaline earth metal component. Finally, the patentees of U.S. Pat. Nos. 3,487,009; 3,507,780; 3,507,781; 3,554,902 and 3,578,583 disclose the existence of various types of supported iridium-containing catalysts and their use in the reforming of naphtha fractions.

SUMMARY OF THE INVENTION

According to the present invention, it has been discovered that certain specific supported compositions comprising iridium and at least one additional metal selected from the group consisting of ruthenium, rhodium, palladium, osmium, platinum, copper, silver, gold and mixtures thereof wherein the iridium and additional metal or metals are present on the surface of the support in polymetallic clusters of specific characteristics as defined hereinbelow, and are unusually effective naphtha reforming catalysts. Polymetallic clusters containing platinum and iridium are preferred.

Figure 1:
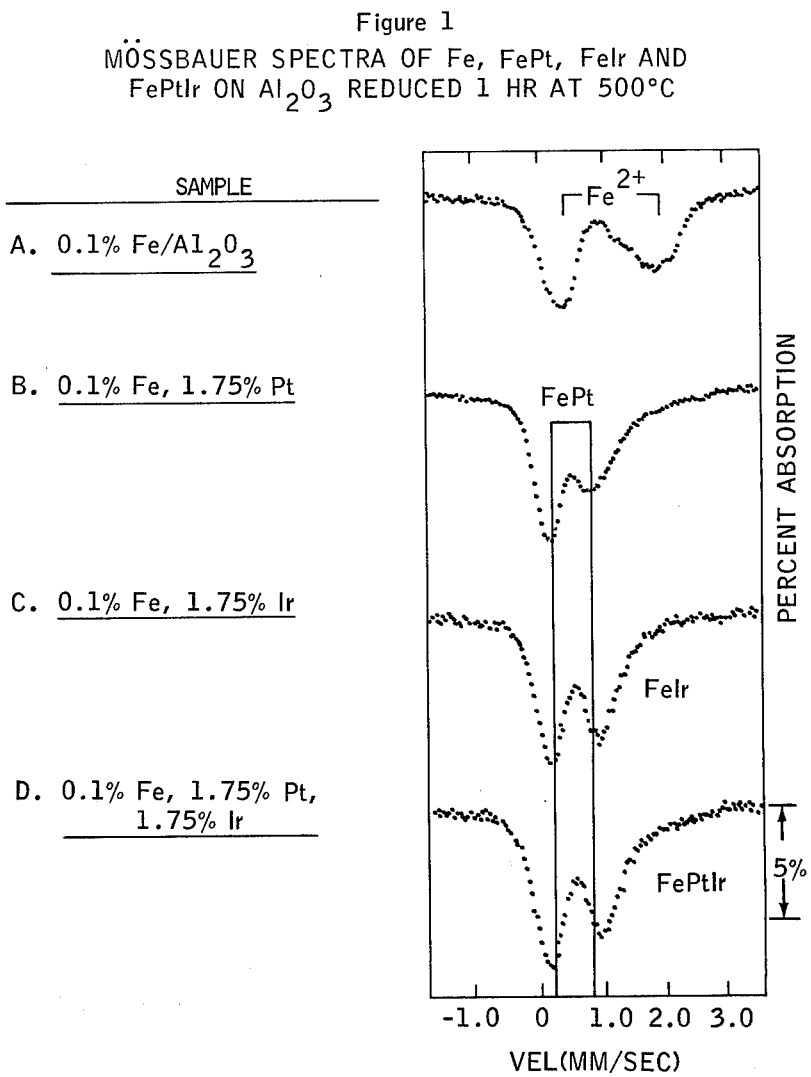
FIG. 1 shows Mössbauer spectra of alumina supported sample compositions containing: 0.1 wt. % Fe (sample A); 0.1 wt. % Fe, 1.75 wt. % Pt (sample B); 0.1 wt. % Fe, 1.75 wt. % Ir (sample C); and 0.1 wt. % Fe, 1.75 wt. % of each of Pt and Ir (sample D).

The compositions of the present invention, which are useful as hydrocarbon conversion catalysts, comprise polymetallic clusters of iridium and at least one additional metal selected from rhodium, ruthenium, palladium, osmium, platinum, copper, silver and gold on a refractory support. The iridium and each additional metallic component, collectively designated as the active metallic fraction of the catalyst, are typically present in an atomic ratio varying from about 1 : 10 to about 10 : 1. The surface area of the active metallic fraction of the catalyst is at least about 50 square meters per gram of said metallic fraction as determined by chemisorption methods described by Sinfelt and Yates, J. Catalysis, 8, 82 – 90 (1967); preferably, however, the surface area is at least about 100 m²/gm., and still more preferably, for naphtha reforming processes, at least about 200 m²/gm. For naphtha reforming applications the catalyst sulfur content should be maintained lower than about two atoms of sulfur, preferably lower than about one atom of sulfur, per atom of iridium and additional catalyst metals, and the catalyst support material should be substantially free of alkali or alkaline earth metal constituents (alkali or alkaline earth metals or compounds thereof). As noted above, the catalysts of the present invention are particularly effective naphtha reforming catalysts. Applicants have discovered that supported, polymetallic, iridium-containing catalysts of the present invention, prepared in a manner which is most favorable for the formation of highly dispersed polymetallic clusters, are superior to iridium-containing catalysts prepared by procedures less likely to yield said highly dispersed polymetallic clusters.

It is well known that supported metal catalysts can be prepared in a very highly dispersed form, such that the fraction of metal atoms present as surface atoms is commonly greater than about 20%, and in some cases approaches 100%. Stated in another way, metal crystallite sizes of the order of 50 A or smaller are typical for such catalysts (see, for example, J. H. Sinfelt, "Bifunctional Catalysis," Advances in Chemical Engineering, 5, 39 (1964), and J. H. Sinfelt, "Catalytic Hydrogenolysis by Supported Metals," Catalysis Reviews, 3,(2), 177–182 (1969) for a discussion of this subject). The existence of crystallites consisting of a single metal with these characteristics has been well established by such techniques as gas chemisorption and high resolution electron microscopy (see, for example, J. H. Sinfelt, "Catalysis Over Supported Metals," Chemical Engineering Progress Symposium Series, 63(73), 16–21 (1967) for further information). Highly dispersed supported metals, for example, platinum or iridium supported on a high surface area refractory carrier such as alumina or silica, are active catalysts for such reactions as the hydrogenation, aromatization, and hydrogenolysis of appropriate hydrocarbon molecules.

While individual highly dispersed metals such as platinum or iridium are good catalysts for a variety of hydrocarbon reactions, one may conceive that for certain types of catalytic applications a combination of the atoms of two or more different metals in a single crystallite would be desirable. Such a hypothetical crystallite would have a high dispersion, i.e., a high fraction of its atoms would be present on the surface of the crystallite. The crystallites would generally be dispersed on the surface of a carrier. In terms of crystallite size, the crystallites would be of the order of 50 A or smaller in dimensions. In an extreme case, the crystallites would be so small that the atoms of the different metals constituting the crystallites would virtually all be surface atoms. In this situation, it is even conceivable that the structures of interest exist in the form of two dimensional, incomplete monolayers ("patches") on the surface of the carrier. Thus, polymetallic structures with dimensions of 50 A or smaller are proposed as catalyst entities. In general, such structures will herein be designated as "polymetallic clusters." The extent of coverage of the carrier surface by the clusters will generally be less than about 10% and frequently less than about 1%. The metallic atoms which constitute the cluster are separated by distances of the magnitude of interatomic distances in metallic crystals, i.e., about 2.5 to 4.0A, which is very small compared to a calculated average distance between the centers of the clusters themselves, said average distance being calculated by assuming clusters of uniform size which are uniformly distributed over the surface of the support. The latter distance typically corresponds to a factor at least 10 times the average distance between atoms in the cluster.

The "polymetallic cluster" concept is a very general one, with applicability to a variety of combinations of metallic elements. For example, a variety of combinations of metals within Groups VIII and IB of the periodic table could be visualized to form polymetallic clusters. Some examples include platinum-iridium, platinum-rhodium, platinum-ruthenium, platinum-palladium, platinum-gold, iridium-gold, platinum-copper, iridium-copper, palladium-gold, palladium-copper, ruthenium-copper, osmium-copper, nickel-copper, cobalt-copper, iron-copper, platinum-iridium-rhodium, platinum-iridium-ruthenium, platinum-iridium-gold, and platinum-iridium-copper. Systems of interest are not limited to combinations of metals which are highly miscible in the bulk, especially when the metal clusters are extremely small. In such cases, however, the stability of the polymetallic cluster phase would depend on the degree of dispersion of the metal. Virtually any property of a metal catalyst (i.e., activity, selectivity, or stability) may be influenced by combining it with one or more metals in the form of polymetallic clusters.

Clusters containing atoms of two different metals are simply termed "bimetallic clusters." Such structures, in particular platinum-iridium clusters, constitute the present invention. In a typical platinum-iridium bimetallic cluster catalyst, the individual clusters contain atoms of both platinum and iridium, and are supported on a refractory carrier such as silica or alumina. Platinum-iridium cluster catalysts of this type have been found to be highly active for a variety of hydrocarbon reactions, and to be exceptionally resistant to fouling of the catalyst surface by carbonaceous residues. This results in superior maintenance of catalytic activity in hydrocarbon conversion processes such as catalytic reforming.

The support or carrier component of the catalysts of the present invention is preferably a porous, adsorptive material having a surface area, as determined by the Brunauer-Emmett-Teller (BET) method, above about 20 square meters per gram, preferably above about 100 square meters/gram. The support material should be substantially refractory at the temperature and pressure conditions utilized in any given hydrocarbon conversion process. Useful support materials include: (a) refractory inorganic oxides such as alumina, silica, titania, magnesia, thoria,, zirconia, chromia, silica-alumina, silica-zirconia, alumina-titania, alumina-chromia, etc.; (b) carbon and silicon carbide; (c) crystalline aluminosilicate zeolite materials such as naturally occurring or synthetic erionite, mordenite, faujasite, etc. that may or may not be previously converted to a hydrogen or ammonium form and reduced in soda content by virtue of an exchange with various metal ions, including rare earth metal cations; and (d) mixtures of one or more of the materials referred to above.

Refractory inorganic oxide materials are the preferred catalyst support materials, particularly silica and alumina or mixtures thereof. Alumina is the preferred reforming catalyst support material. The support materials described above are known articles of commerce and can be prepared for use as catalyst constituents by many varied techniques. Typically, the support materials are used in the form of spheres, granules, powders, extrudates or pellets, etc.

Iridium and at least one additional metal selected from ruthenium, rhodium, palladium, osmium, platinum, copper, silver and gold are present on the surface of the refractory support. Preferably, the catalyst consists of highly dispersed polymetallic clusters comprising atoms of iridium and platinum on a refractory support. It has been discovered that improved catalytic results are obtained when the catalyst is prepared in a manner which would be expected to favor formation of highly dispersed polymetallic clusters.

In general, polymetallic cluster catalysts should have at least 0.01 wt. % iridium for hydrocarbon conversion, and especially for naphtha reforming, it is preferred that the catalyst contain greater than about 0.1 wt. % iridium, based on the dry weight of the total catalyst. Similarly, at least about 0.1 wt. % of each additional catalyst metal should also be present in a naphtha reforming catalyst for maximum effectiveness. Specifically, iridium is present in the catalyst in amounts varying from greater than about 0.1 to about 1.0 wt. %, preferably 0.15 to 0.5 wt. %, and still more preferably 0.2 to 0.5 wt. %, based upon total weight of the dry catalyst. Typically, additional catalyst metals, preferably platinum, are present in the catalyst in amounts varying from about 0.1 to 1.0 wt. %, preferably 0.15 to 0.5 wt. %, based upon the dry weight of the catalyst. Iridium/platinum-containing naphtha reforming catalysts having maximum effectiveness normally contain greater than about 0.1 to about 1.0 wt. % iridium, preferably about 0.15 to 0.5 wt. %, and still more preferably 0.2 to 0.5 wt. %, and about 0.1 to 1.0 wt. % platinum, preferably about 0.15 to 0.5 wt. %, based on total catalyst.

The atomic ratio of iridium metal to additional catalyst metals on the surface of the support may vary from about 1 : 10 to 10 : 1, preferably from about 1 : 3 to 3 : 1. As noted earlier, the iridium and additional catalyst metals should have a surface area greater than about 50, preferably greater than about 100, and most preferably greater than about 200 square meters per gram of metal in the catalyst. Maximum metal surface area can be achieved by taking steps to insure that the iridium in the catalyst is not present in a crystalline oxide form immediately prior to reduction. A simple reduction of crystalline iridium oxide does not serve to disperse the resulting iridium in the desired manner, i.e., to yield highly dispersed polymetallic clusters.

The performance of the catalyst system of the present invention is affected by the presence of sulfur-containing materials arising from the feed stock or other sources. Accordingly, when the catalyst is employed for reforming hydrocarbons, the content of sulfur species in the catalyst should be maintained at a level corresponding to lower than about two atoms of sulfur, preferably lower than one atom of sulfur, per atom of iridium and additional catalyst metals. The desired low catalyst sulfur levels should be maintained during the predominant portion of any reforming cycle. Higher catalyst sulfur levels may be encountered during some portions of a naphtha reforming run such as during start-up or in the event of a process upset. Sulfur is removed from the catalyst, at least in part, by contacting the same with sulfur-free feed stock. Finally, the catalyst should be substantially free of alkali metal (Group IA) or alkaline earth metal (Group IIA) constituents (less than 0.1 wt. %), since the presence of basic components on the catalyst serves to inhibit certain reforming reactions.

The catalyst of the present invention can be prepared employing simple impregnation techniques. Specifically, the catalyst is prepared by impregnating the catalyst support material with a solution of a soluble iridium compound and a soluble compound of the additional catalyst metal. Desirably, an aqueous solution of the metal compounds is used. Typically, the metal compounds are impregnated on the catalyst support simultaneously to maximize the desired interaction between the iridium and other metal components, and thus enhance formation of a highly dispersed polymetallic cluster structure in the final reduced form of the catalyst. The carrier material is impregnated with an aqueous solution of decomposable compounds of the iridium and one or more additional catalyst metals in sufficient concentration to provide the desired quantity of metal in the finished catalyst. Iridium compounds suitable for incorporation onto the carrier include, among others, chloroiridic acid, iridium tribromide, ammonium chloroiridate, iridium trichloride, etc. Additional catalyst metals may be incorporated onto the support material by employing compounds such as chloroplatinic acid, ammonium chloroplatinate, platinum amine salts, ruthenium trichloride, rhodium trichloride, rhodium nitrate, palladium chloride, palladium amine salts, osmium trichloride, chloroosmic acid, auric chloride, chloroauric acid, silver nitrate, copper nitrate and copper chloride. The preferred catalyst manufacturing technique involves contacting a previously prepared support, such as alumina, with an aqueous solution of an iridium compound and a compound of at least one additional catalyst metal selected from ruthenium, rhodium, palladium, osmium, platinum, copper, silver and gold.

Following the impregnation of the carrier with the iridium and additional metal compounds, the composite catalyst material is dried at a temperature varying from about 220° to 250°F. The catalyst may simply be dried in air at the above stated temperatures or may be dried by treating the catalyst in a flowing stream of inert gas or hydrogen. The drying step may be followed by an additional calcination step at a temperature of about 500° – 700°F. Care must be taken to avoid contacting the catalyst at temperatures in excess of about 700° – 850°F. with air or other gas of high oxygen concentration. Otherwise large iridium oxide crystallites will be formed, and the desired polymetallic cluster structure will not be obtained on reduction. The catalyst is typically reduced at temperatures of 500° – 1000°F., or higher, in hydrogen prior to use.

Additional materials may be added to the catalyst to promote various types of hydrocarbon conversion reactions. For example, the naphtha reforming activity of the catalyst is improved by the addition of a halogen moiety, particularly a chlorine or fluorine moiety, to the catalyst. The halogen is present in the catalyst in amounts varying from about 0.1 to about 3 wt. % based on total dry weight of the catalyst. The halogens may be incorporated into the catalyst at any suitable stage in the catalyst manufacture, i.e., before, during, or after incorporation of the catalyst metals onto the support material. Halogen is often incorporated into the catalyst when impregnating the support with halogen-bearing metal catalyst components, such as chloroplatinic acid and chloroiridic acid. Further amounts of halogen may be incorporated in the catalyst by contacting it with materials such as hydrogen fluoride and hydrogen chloride, either prior to or subsequent to the metal impregnation step. Halogen may also be incorporated by contacting the catalyst with a gaseous stream containing the halogen, generally chlorine.

The catalyst composition of the present invention have many varied uses. For example, the catalysts can be employed in the formation of aromatic compounds by contacting the catalyst with suitable paraffins or naphthenes at a temperature varying between about 700° and 1000°F. and a pressure of less than about 10 atmospheres in the presence of hydrogen. The catalysts of this invention can also be employed to promote the isomerization of ethylbenzene to xylenes by contacting ethylbenzene with the catalyst at a temperature varying from about 400° to 1100°F. at elevated pressures in the presence of hydrogen. The catalyst is also useful for promoting hydrogenation, hydrogenolysis, hydrocracking, dealkylation of aromatics, and other reactions known to the art. However, the catalysts are particularly useful in naphtha reforming processes.

In a naphtha hydroforming (reforming) process, a substantially sulfur-free naphtha stream that typically contains about 20 – 80 volume % paraffins, 20 – 80 volume % naphthenes, and about 5% to 20% aromatics, and boiling at atmospheric pressure substantially between about 80° and 450°F., preferably between about 150° and 375°F., is brought into contact with the catalyst system of the present invention in the presence of hydrogen. The reactions typically take place in the vapor phase at a temperature varying from about 650° to 1000°F., preferably about 750° to 980°F. Reaction zone pressures may vary from about 1 to 50 atmospheres, preferably from about 5 to 25 atmospheres.

The naphtha feedstream is generally passed over the catalyst at space velocities varying from about 0.5 to 20 parts by weight of naphtha per hour per part by weight of catalyst (w/hr./w), preferably from about 1 to 10 w/hr./w. The hydrogen to hydrocarbon molel ratio within the reaction zone is maintained between about 0.5 and 20, preferably between about 1 and 10. During the reforming process, the hydrogen employed can be in admixture with light gaseous hydrocarbons. Since the hydroforming process produces large quantities of hydrogen, a recycle stream is employed for admission of hydrogen with the feed.

In a typical operation, the catalyst is maintained as a fixed bed within a series of adiabatically operated reactors. Specifically, the product stream from each reactor (except the last) in the reactor series is reheated prior to passage to the following reactor.

A naphtha reforming operation involves a plurality of reactions that occur simultaneously. Specifically, the naphthene portion of the naphtha stream is dehydrogenated to the corresponding aromatic compounds, the normal paraffins are isomerized to branched chain paraffins, and various aromatics compounds are isomerized to other aromatics. The high boiling components in the naphtha stream are also hydrocracked to lower boiling components. The platinum-iridium catalyst of this invention has been found to be a particularly active dehydrocyclization catalyst, that is, an active catalyst for the conversion of paraffins to aromatics. Accordingly, the catalysts of the present invention can be used very effectively in the final reactors of a reactor series to promote the conversion of paraffins to aromatics, after the naphthenes contained in the naphtha streams have been converted to aromatics in an initial reaction zone with the use of a conventional reforming catalyst such as platinum on alumina.

An outstanding feature of the instant platinum-iridium reforming catalyst is its ability to maintain its catalytic activity at commercially desirable levels for protracted periods of time. In a typical commercial semi-regenerative naphtha reforming process, reaction temperature is increased during the course of the run to maintain constant product octane level. Raising the reaction temperature is necessitated because the catalyst is continuously deactivated as coke is laid down on the catalyst. Unfortunately, the reaction temperature cannot be raised much beyond about 1000°F. before rapid catalyst deactivation commences. Therefore, as the reaction temperature approaches about 1000°F., it is necessary to regenerate or replace the catalyst. Typically, a regeneration operation consists of burning the coke deposits from the catalyst and thereafter treating the catalyst with chlorine, HCl, organic chlorides or mixtures thereof in the presence or absence of oxygen or other materials such as water vapor, nitrogen, flue gas, etc.

It is desirable to increase the duration of the periods between process start-up and catalyst regeneration and/or between catalyst regenerations since valuable production time is lost when the catalyst is being regenerated. As noted above, the present platinumiridium catalyst has unusual activity maintenance characteristics and, accordingly, needs to be regenerated very infrequently. The catalyst can be used to promote a semi-regenerative naphtha reforming operation conducted at conditions described above to obtain on-stream cycle lengths corresponding to the processing of at least about 50 barrels of naphtha feed stock per pound of catalyst to form $C_5+$ reformate product having a research clear octane number of at least 100 without incurring a $C_5+$ reformate yield loss greater than about 3 volume % for the last 95% of the reforming cycle (period between start-up and catalyst regeneration), the cycle beginning with either a fresh or freshly regenerated catalyst. More typically, the catalyst can be used to process prior to regeneration up to 60 and frequently in excess of 75 barrels of feed stock per pound of catalyst to obtain a 100+ research clear octane number product without incurring a yield loss in excess of that mentioned above.

DESCRIPTION OF THE PREFERRED EMBODIMENTS

Example 1

Several platinum-iridium on silica catalysts were prepared by coimpregnation of silica with an aqueous solution of chloroplatinic and chloroiridic acids. Approximately 2.2 milliliters of impregnating solution were employed per gram of silica. The concentrations of chloroplatinic and chloroiridic acids in solution were chosen to give the desired amounts of platinum and iridium in the final catalysts. The silica employed had a surface area of approximately 300 m$^2$/gm. After impregnation, the catalysts were dried at 110°C. (230°F) and subsequently reduced in hydrogen at 500°C. (932°F.).

X-ray diffraction data were obtained on a series of catalysts prepared by the method just described. From the positions of the lines in the diffraction patterns, i.e., the diffraction angles at which maximum intensities of the diffracted X-rays are observed, the lattice constants of the small metal crystallites in the catalysts were determined using the Bragg equation (see, e. g., B. D. Cullity, "Elements of X-Ray Diffraction," Addison-Wesley, 1956, pp 84, 88, 324). Estimates of the size of the metal crystallites were obtained from the widths of the diffraction lines at half-maximum intensity using the Scherrer formula (see, e.g., B. D. Cullity, "Elements of X-Ray Diffraction," Addison-Wesley, 1956, p. 99). The diffraction lines used in obtaining this information corresponded to X-ray reflections from the (220) lattice planes of the metal crystallites. Copper K$\alpha$ X-rays with a wave length of 1.54 A were employed. When the experimentally determined lattice constants are compared with known lattice constants for pure platinum (3.923 A) and pure iridium (3.839 A), the values are found to be intermediate between the values for the pure metals. This provides evidence that the catalysts contain bimetallic crystallites composed of atoms of both platinum and iridium in individual crystallites. Data are summarized in the following table:

TABLE I

| | X-Ray Diffraction Data on Pt-Ir Catalysts | | | | |
|---|---|---|---|---|---|
| | | X-Ray Diffraction Parameters | | Crystallite | Lattice |
| Catalyst | Nominal Composition, wt. % | 2Θ* | B** | size, A | Parameter, A |
| A | 10% Pt, 10% Ir | 68.5 ± 0.2 | 2.0 | 49 | 3.875 ± 0.010 |
| B | 5% Pt, 5% Ir | 68.5 ± 0.2 | 2.8 | 35 | 3.875 ± 0.010 |

TABLE I-continued

X-Ray Diffraction Data on Pt-Ir Catalysts

| Catalyst | Nominal Composition, wt. % | X-Ray Diffraction Parameters | | Crystallite size, A | Lattice Parameter, A |
| --- | --- | --- | --- | --- | --- |
| | | 2Θ* | B** | | |
| C | 2.5% Pt, 2.5% Ir | 68.2 ± 0.2 | 3.6 | 27 | 3.890 ± 0.010 |

*Diffraction angle corresponding to maximum intensity of diffracted X-ray, degrees.
**Width of X-ray line at half maximum intensity, degrees.

When the lattice constants are compared with known values for platinum-iridium alloys of different compositions (see W. B. Pearson, "A Handbook of Lattice Spacings and Structures of Metals and Alloys," Pergamon Press, 1964, p. 704), the compositions of the platinum-iridium bimetallic crystallites in catalysts A and B are estimated to be approximately 50 atomic percent iridium, while those in catalyst C are about 32 atomic percent iridium. The accuracy of these composition values is estimated to be about × 10 atomic percent.

The data of this example provide evidence that bimetallic crystallites or clusters containing atoms of both platinum and iridium are formed in the crystallite size range of 27 to 49 A.

Example 2

Hydrogen chemisorption data were obtained on the platinum-iridium-silica catalysts of Example 1 and on a platinum-iridium-alumina catalyst. The latter catalyst contained 0.5 wt. % iridium and 0.5 wt. % platinum. It was prepared by the same method used for the platinum-iridium-silica catalysts, except that eta alumina with a surface area of approximately 200 m²/gm was used instead of silica as the support. Also, the amount of impregnating solution employed was 0.65 milliliter per gram of alumina.

The hydrogen chemisorption data were obtained at room temperature by a method described by Sinfelt and Yates, J. Catalysis, 8, 82 – 90 (1967). Two absorption isotherms were obtained on each catalyst sample with the sample being evacuated for approximately 10 minutes between the first and second isotherms. The second isotherm thus gives a measure of the weakly adsorbed hydrogen, while the difference between the first and second isotherms gives a measure of the strongly chemisorbed hydrogen. The latter quantity is used to determine the degree of metal dispersion, which is defined as the percentage of metal atoms in the catalyst appearing in the surface (see, e.g., J. H. Sinfelt, "Annual Review of Materials Science," Volume 2, 1972, p. 649). Data on the degree of metal dispersion are given in the following table, along with values of the metal surface area derived from the chemisorption data.

TABLE II

Metal Dispersion Data on Pt-Ir Catalysts

| Catalyst | Metal Dispersion, % | Metal Surface Area, m²/gm. |
| --- | --- | --- |
| 10% Pt, 10% Ir-SiO₂ | 24 | 56 |
| 5% Pt, 5% Ir-SiO₂ | 32 | 75 |
| 2.5% Pt, 2.5% Ir-SiO₂ | 60 | 141 |
| 0.5% Pt, 0.5% Ir-Al₂O₃ | 98 | 230 |

A metal dispersion of 100% corresponds to a metal surface area of 235 m²/gram of metal. The data of this example are illustrative of bimetallic platinum-iridium cluster catalysts covering a range of metal dispersion from 24 to virtually 100%. The activity of platinum-iridium reforming catalysts increases as the percent metal dispersion on the support increases (i.e., as metal surface area increases or as platinum-iridium crystallite size decreases). Desirably, metal dispersions should be in the order of at least about 25% (~ 59 m²/gram), preferably, at least about 50% (~ 117 m²/gram), more preferably, at least about 75% (~ 176 m²/gram), and, still more preferably, above about 85% (~ 200 m²/gram)

Example 3

A platinum-iridium-silica catalyst containing 5 wt. % platinum and 5 wt. % iridium was prepared by the method of Example 1, except that the catalyst was calcined in air at 500°C. (932°F.) for approximately 16 hours subsequent to drying at 110°C. (230°F.). A platinum-irridium-alumina catalyst containing 1 wt. % platinum and 1 wt. % iridium was prepared by the method of Example 2, except that it too was calcined in air at 500°C. (932°F.) for approximately 16 hours subsequent to the drying step. X-ray diffraction patterns obtained on these catalysts showed that large crystallites of iridium dioxide were present. Crystallite sizes of the iridium dioxide determined from widths of the (110) diffraction lines, using Cu Kα X-rays at a diffraction angle (2θ) of 28.0°, were 290 A and 260 A, respectively, for the platinum-iridium-silica and platinum-iridium-alumina catalysts.

On treatment of both catalysts at 500°C. (932°F.) with hydrogen for 2 hours, the iridium dioxide crystallites are reduced to metallic iridium crystallites of similar size. At this point, there exists a mixture of large iridium crystallites and a separate, more highly dispersed platinum phase.

This example shows that calcination of supported platinum-iridium catalysts in air at 500°C. (932°F.), which is a procedure commonly employed in the preparation of platinum and other Group VIII metal catalysts, is unsatisfactory for the preparation of well dispersed platinum-iridium cluster catalysts.

Example 4

Platinum-alumina, iridium-alumina, and platinum-iridium-alumina catalysts containing an amount of iron which is small compared to the amounts of platinum or iridium were prepared for Mössbauer spectroscopy experiments. The iron was added as a sensitive Mössbauer probe element to obtain information on the state of the platinum and iridium in the catalysts. The catalysts were prepared by impregnating batches of alumina with solutions of appropriate compounds of the metals, using 0.5 cc of solution per gram of alumina. The platinum and iridium solutions were prepared from chloroplatinic and chloroiridic acids, respectively, while the iron solution was prepared by dissolving iron metal, containing 93% of the isotope Fe⁵⁷, in 6N HNO₃. Platinum, iridium and platinum-iridium catalysts, after impregnation, were dried 16 hours at 120°C. and 4 hours at 260°C. in air. Iron-57 was then impregnated onto the platinum, iridium and platinum-iridium catalysts in the manner described above. This was followed by an additional drying for 16 hours at 120°C. and 1 hour at 260°C. in air. For comparison, a sample containing only $Fe^{57}$ on alumina was prepared by impregnation followed by drying for 16 hours at 120°C. and 1 hour at 260°C. in air. The samples examined by Mössbauer spectroscopy are identified below:

| | | |
|---|---|---|
| A | | 0.1 wt. % $Fe/Al_2O_3$ |
| B | 0.1 wt. % Fe, | 1.75 wt. % $Pt/Al_2O_3$ |
| C | 0.1 wt. % Fe, | 1.75 wt. % $Ir/Al_2O_3$ |
| D | 0.1 wt. % Fe, | 1.75 wt. % Pt / $Al_2O_3$ 1.75 wt. % Ir |

The metal surface areas of samples B, C and D were determined by selective gas chemisorption using hydrogen on samples reduced in hydrogen for 1 hour at 500°C. and subsequently evacuated for ½ hour at 450°C. These results are summarized in Table III.

TABLE III

Metal Surface Areas of Samples B, C and D

| | | | Metal Surface Area ($m^2$/g Metal)* | Metal Dispersion, % |
|---|---|---|---|---|
| B | (0.1% Fe, | 1.75% $Pt/Al_2O_3$) | 212 | 90 |
| C | (0.1% Fe, | 1.75% $Ir/Al_2O_3$) | 235 | 100 |
| D | (0.1% Fe, | 1.75% Pt 1.75% Ir /$Al_2O_3$) | 235 | 100 |

* An area of 7.6$A^2$/atom was used for Pt and Ir and 6.5$A^2$/atom for Fe. The area per atom used in this calculation was an average based on the atomic percentages of the metals in a particular sample.

Samples A through D were each reduced in hydrogen for 1 hour at 500°C. and examined in situ by Mössbauer spectroscopy at 25°C. These results are shown in FIG. 1 (A – D). Three parameters are derived from these spectra and provide a "fingerprint" of a particular catalyst.

1. Isomer shift (IS) — The centroid of the spectrum in units of millimeters per second.
2. Quadrupole splitting (QS) — The separation of the two peaks in a spectrum in units of millimeters per second.
3. The ratio of the area under the right-hand peak to the area under the left-hand peak ($A_2/A_1$).

The Mössbauer parameters determined from the spectra in FIG. 1 are summarized in Table IV.

TABLE IV $Fe^{57}$ "Fingerprints" for Samples A, B, C and D Reduced at 500°C.

| Sample | | IS | QS | $A_2/A_1$ |
|---|---|---|---|---|
| A | 0.1% Fe | 1.20 | 1.69 | — |
| B | 1.75% Pt(Fe) | 0.53 | 0.82 | 1.71 |
| C | 1.75% Ir(Fe) | 0.58 | 0.97 | 1.18 |
| D | 1.75% Pt 1.75% Ir (Fe) | 0.56 | 0.89 | 1.16 |

The spectrum for sample A in FIG. 1 and the corresponding Mössbauer parameters for sample A in Table IV are characteristic of iron in the ferrous state. There is no evidence for the presence of metallic iron. The iron "fingerprints" for samples B, C and D are much different from that of sample A. The "fingerprints" for samples B, C and D show that the iron is chemically associated with the noble metals in these materials. There are two reasons for this conclusion.

1. The iron "fingerprints" are different for samples B, C and D indicating that the chemical environment of the iron atoms is different in each case.
2. The iron in samples B, C and D after reduction at 500°C. could be oxidized to ferric ions on exposure to oxygen at 25°C. and re-reduced on exposure to hydrogen at 25°C. This behavior would not be expected of isolated iron metal particles but would be expected of iron chemically associated with the noble metals. The intimate contact between the iron atoms and the noble metal atoms in the clusters allows the noble metal to catalyze the reduction of the iron at 25°C.

The iron "fingerprint" for sample D differs from that of both samples B and C suggesting that the iron atoms in sample D are contained in metal clusters which consist of both platinum and iridium. Additional experiments described in the examples to follow confirm this suggestion.

Example 5

Figure 2:
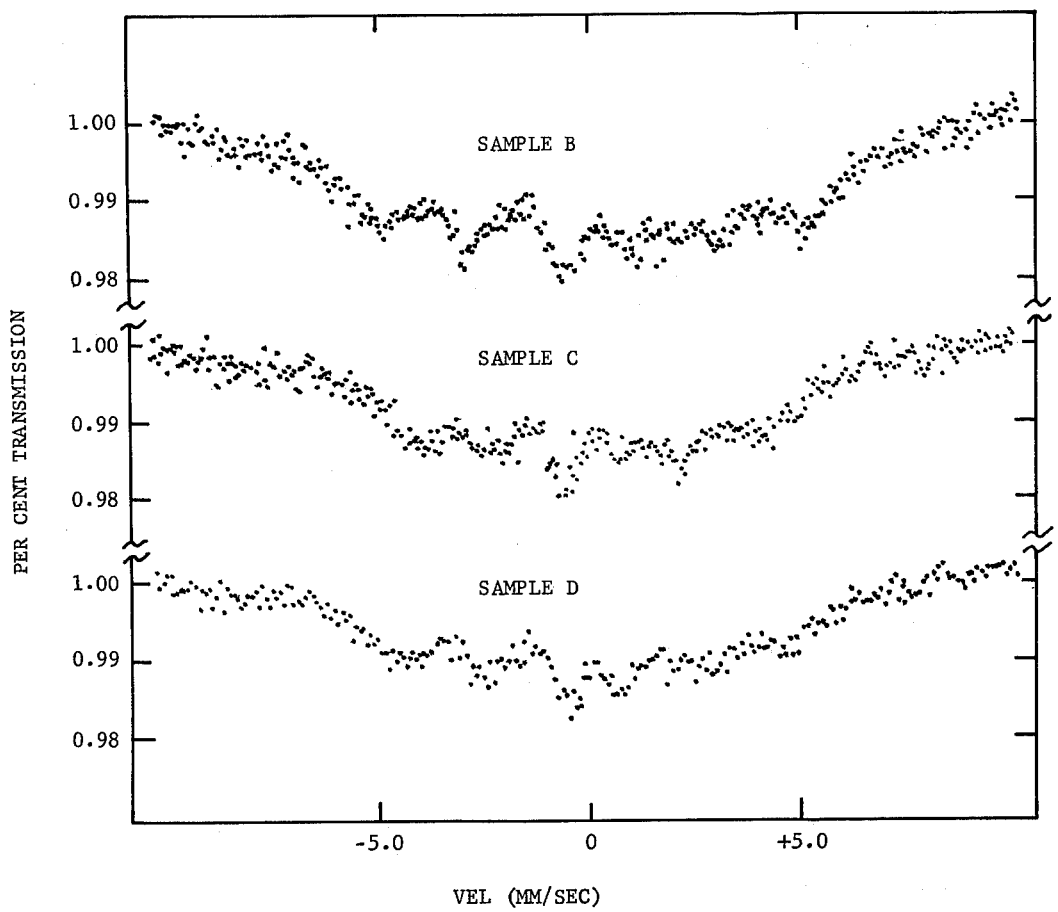
FIG. 2 shows ferromagnetic Mössbauer spectra of samples B, C, and D. The samples were reduced in hydrogen for one hour at 500°C. and were examined at very low temperatures (18° to 23.5°K).

Samples B, C and D were reduced in hydrogen for 1 hour at 500°C. as in the previous example but were examined at very low temperatures (18° to 23.5°K). At such temperatures the samples become ferromagnetic and the Mössbauer spectrum changes from two lines to six lines. The magnitude of the magnetic field which the iron atoms "see" can be determined from the separation (in millimeters per second) of lines one and six in the ferromagnetic Mössbauer spectrum. The ferromagnetic Mössbauer spectra for samples B, C and D are shown in FIG. 2. Magnetic fields derived from the spectra in FIG. 2 are given in Table V.

TABLE V

LOW TEMPERATURE MAGNETIC SPECTRA CONFIRM PtIr CLUSTERS

| | | T(°K) | Magnetic Field (Kilo-Orsteds) |
|---|---|---|---|
| B | (FePt) | 21.0 | 325 |
| C | (FeIr) | 23.5 | 260 |
| D | (FePtIr) | 18.0 | 295 |

These results provide additional proof that the iron atoms in samples B, C and D are associated with the noble metals since the magnitudes of the magnetic fields are dependent on the noble metal or metals present. Mizoguchi, Sasaki and Chikayumi [Amer. Inst. Phys. Conf. Proc. 5, 445 (1972)] investigated bulk PtFe, IrFe and PtIrFe alloys and found that the magnetic fields at the iron atoms for IrFe were much smaller than those observed for PtFe. In addition, the magnitude of the magnetic field at the iron atoms in IrFe increased as Pt was added to the alloy. The same trends are observed for samples B, C and D as shown in Table V and indicate that sample D consists of Pt-Ir clusters in association with Fe rather than separate Pt clusters and separate Ir clusters, each in association with Fe.

Example 6

Another series of Pt, Ir and Pt-Ir catalysts was prepared by the impregnation procedure described previously. After the impregnations the Pt, Ir and PtIr catalysts were dried for 16 hours at 120°C. in air and then calcined 4 hours at 600°C. in air. The calcined Pt, Ir and PtIr catalysts were then impregnated with 0.1 wt. % $Fe^{57}$, as described previously, followed by drying for 16 hours at 120°C. and 1 hour at 260°C. in air. These samples are identified below:

| | | |
|---|---|---|
| B-600 | 0.1% Fe, | 1.75% $Pt/Al_2O_3$ |
| C-600 | 0.1% Fe, | 1.75% $Ir/Al_2O_3$ |
| D-600 | 0.1% Fe, | 1.75% Ir<br>1.75% Pt /$Al_2O_3$ |

The metal surface areas of these catalysts were determined by selective gas chemisorption using hydrogen on samples reduced in hydrogen for 1 hour at 500°C. and subsequently evacuated for one-half hour at 450°C. These results are summarized in Table VI.

TABLE VI

Metal Areas for Samples B-600, C-600 and D-600

| | | | Metal Area ($m^2$/g Metal)$^a$ | Metal Dispersion, % |
|---|---|---|---|---|
| B-600 | (0.1% Fe, | 1.75% $Pt/Al_2O_3$) | 223 | 95 |
| C-600 | (0.1% Fe, | 1.75% $Ir/Al_2O_3$) | 10 | 4.2 |
| D-600 | (0.1% Fe, | 1.75% Pt<br>1.75% Ir /$Al_2O_3$) | 135 | 57 |

$^a$An area of 7.6$A^2$/atom was used for Pt and Ir and 6.5$A^2$/atom for Fe. The area per atom used in this calculation was an average based on the atomic percentage of the metals in a particular sample.

The data in Table VI show that the calcination does not significantly affect the platinum metal surface area in sample B-600 but strongly reduces the iridium metal area in sample C-600. This behavior for samples B-600 and C-600 suggests that the metal area in sample D-600 is primarily due to the platinum component and that the iridium component contributes very little to the total metal area.

Figure 3:
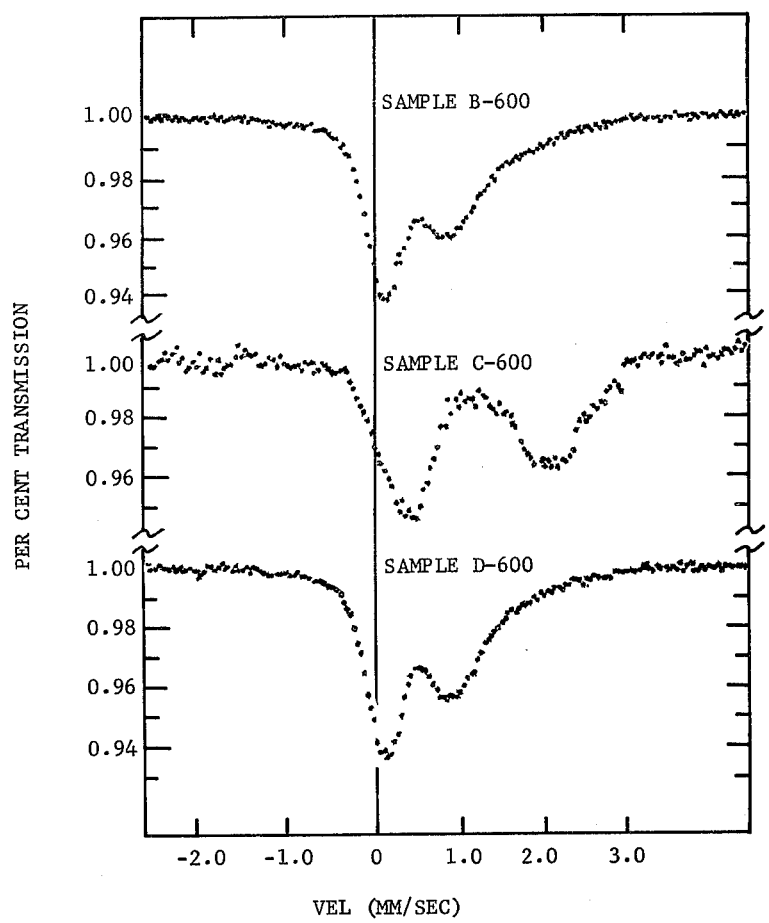
FIG. 3 shows Mössbauer spectra of three samples that were calcined in air for four hours at 600°C.

Samples B-600, C-600 and D-600 were each reduced at 500°C. and examined in situ by Mössbauer spectroscopy. These results are shown in FIG. 3. Sample B-600 gives a "fingerprint" spectrum similar to that of B in FIG. 1 indicating that Pt clusters associated with Fe are still formed in B-600. The spectrum of sample C-600, however, bears little resemblance to that of sample C in FIG. 1 even though the initial compositions of the two samples are the same. The "fingerprint" of sample C-600 is similar to that of sample A in FIG. 1, where the iron is reduced only to the ferrous state. The "fingerprint" of sample D-600 is also different from that of sample D in FIG. 1. The "fingerprint" of sample D-600 indicates that only Pt clusters associated with Fe are formed. The Mössbauer data on samples B-600, C-600 and D-600, when considered in light of the metal surface areas of Table VI, show that air calcination of the samples containing iridium or platinum-iridium at 600°C. is unsatisfactory for the formation of highly dispersed iridium clusters or platinum-iridium clusters.

Example 7

Figure 4:
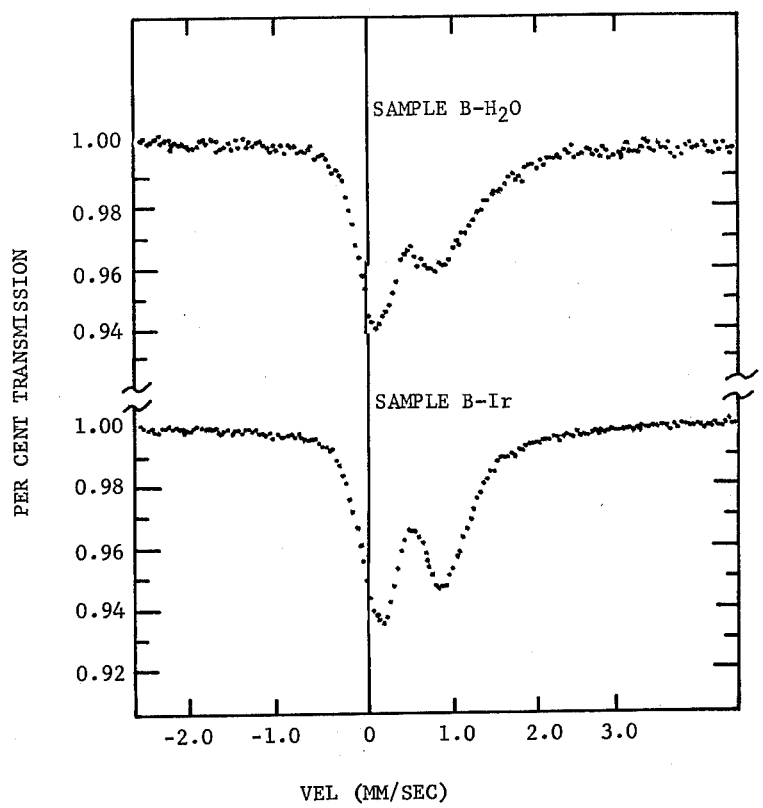
FIG. 4 shows Mössbauer spectra for sequentially impregnated samples reduced for 1 hour at 500°C.

Sample B (0.1% Fe, 1.75% $Pt/Al_2O_3$) described previously was reduced for 1 hour at 500°C. in hydrogen. This reduction formed well-dispersed Pt clusters in association with iron as shown previously. One portion of reduced sample B was impregnated with 0.5 cc of distilled water per gram of sample B followed by drying for 16 hours at 120°C. and 4 hours at 260°C. in air. The resulting material is designated as B-$H_2O$. A second portion of reduced sample B was impregnated with a solution of chloroiridic acid of the appropriate concentration in a ratio of 0.5 cc of iridium solution per gram of B. The resulting material was dried for 16 hours at 120°C. and 4 hours at 260°C. in air. The composition of the final material was 0.1% Fe, 1.75% Pt, 1.75% Ir/$Al_2O_3$ and was designated as B-Ir. Samples B-$H_2O$ and B-Ir were each reduced in hydrogen for 1 hour at 500°C. and examined in situ by Mössbauer spectroscopy. Spectra are shown in FIG. 4. Mossbauer parameters are summarized in Table VII.

TABLE VII

Mossbauer Parameters for Samples B-$H_2O$ and B-Ir Reduced 1 Hour at 500°C.

| Sample | IS | QS | $A_2/A_1$ |
|---|---|---|---|
| B-$H_2O$ | 0.53 | 0.83 | 1.71 |
| B-Ir | 0.57 | 0.86 | 1.13 |

Sample B-$H_2O$ gives a spectrum and Mössbauer parameters identical to those of sample B (see FIG. 1 and Table IV) indicating that Pt clusters in association with Fe are present in the sample and are unaffected by the impregnation with water. Sample B-Ir gives a spectrum and Mössbauer parameters identical to sample D (see FIG. 1 and Table IV) indicating that the Pt clusters associated with Fe are altered by the addition of iridium to the catalyst. This result can only mean that the addition of iridium to reduced sample B which already contains Pt clusters associated with Fe results in the incorporation of the added iridium into these clusters to give PtIr clusters associated with Fe. If the iridium were not incorporated into the original clusters in sample B-Ir but was simply deposited as separate crystallites on the support then the Mössbauer spectrum should have been unaffected by the addition of iridium and been identical to that of sample B-$H_2O$.

Example 8

A platinum-iridium-alumina catalyst containing 0.3 wt. % platinum and 0.3 wt. % iridium was prepared by coimpregnation of 1/16 inch alumina extrudates with an aqueous solution of chloroiridic acid ($H_2IrCl_6.nH_2O$ containing 38.5 wt. % Ir) and chloroplatinic acid ($H_2PtCl_6.nH_2O$ containing 40 wt. % Pt). The solution contained 0.0054 gm. of chloroiridic acid and 0.0052 gm. of chloroplatinic acid per milliliter of solution. Approximately 1.45 milliliters of impregnating solution were used per gram of alumina. The alumina was kept in contact with the impregnating solution overnight, during which time the chloroplatinic and chloroiridic acid species were removed from the solution by the alumina. The depleted solution was then decanted from the alumina, and the latter was dried for 24 hours at 110°C. (230°F.). The dried material was then calcined in air at 260°C. (500°F.) for 4 hours. The alumina used in the preparation was a gamma alumina with a surface area of approximately 180 m²/gm, and is identified as Alumina C.

Example 9

A series of tests was conducted to demonstrate the superior activity and activity maintenance characteristics of platinum-iridium on alumina in comparison with commercially employed platinum-alumina (American Cyanamid PHF-4) and platinum-rhenium-alumina (American Cyanamid PR-6) reforming catalysts. The platinum-iridium catalyst contained 0.3 wt. % platinum and 0.3 wt. % iridium, and was prepared by the method of Example 8. The platinum-alumina catalyst contained 0.3 wt. % platinum and the platinum-rhenium-alumina catalyst contained 0.3 wt. % platinum and 0.3 wt. % rhenium. The catalysts were used for the reforming of a 210°–340°F. boiling range mixed naphtha containing approximately 43 volume % naphthenes, 45 volume % paraffins, and the remainder aromatics.

The reactor system used consisted of an elongated steel tube of approximately 1 inch inside diameter and having a capacity of about 500 cubic centimeters. The reaction tube is positioned within a fluidized sand constant temperature heating bath. In each catalyst test, approximately 150 grams of catalyst diluted with low surface area ceramic beads to a volume of about 500 cubic centimeters were charged to the reactor. The naphtha feedstock and hydrogen were preheated to nominal reaction temperature (sand bath temperature) and passed upflow over the fixed catalyst bed.

Figure 5:
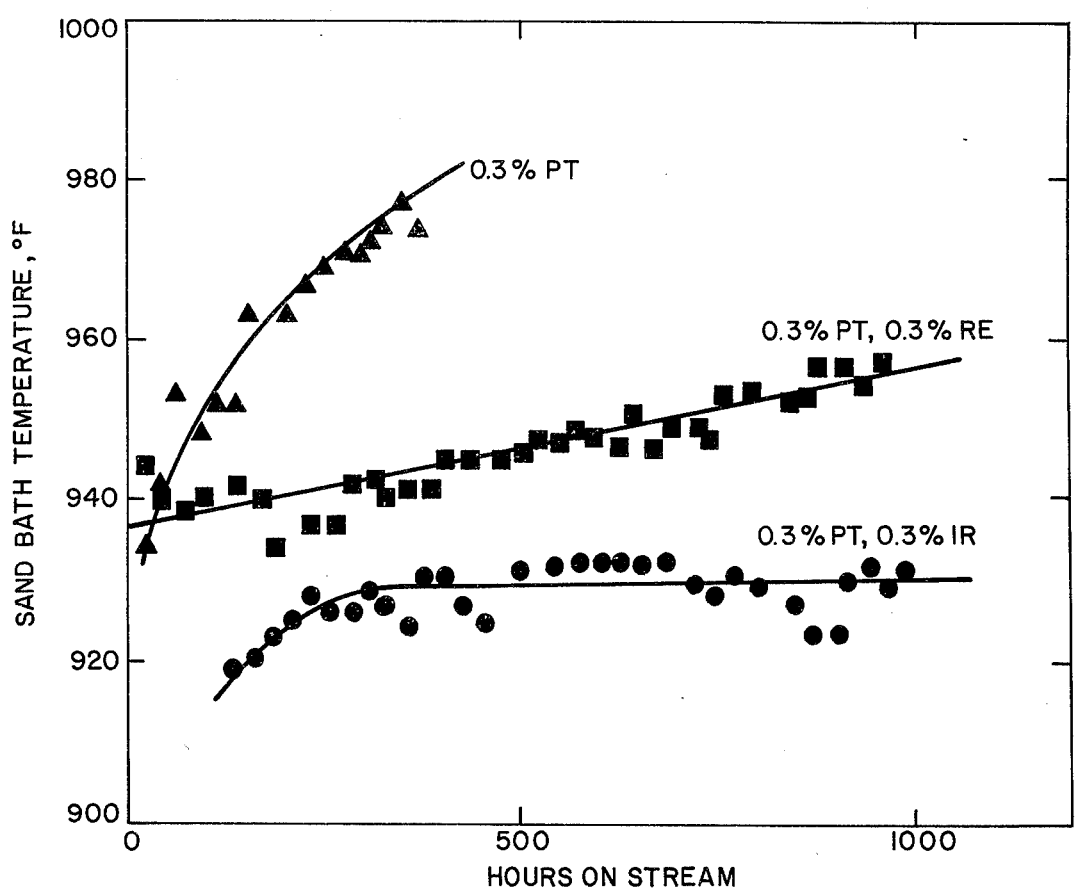
FIG. 5 is a graph of the temperature required, as a function of run length, to give a $C_5$+ reformate with a research clear octane number of 100 utilizing various reforming catalysts.

The weight hourly space velocity of the naphtha was 3, and the hydrogen rate was 5000 standard cubic feet per barrel of naphtha. The reactor pressure was maintained at 200 psig. The temperature of the fluidized sand heating bath surrounding the reactor was selected to give a $C_5+$ reformate with a research clear octane number of 100. As the catalyst deactivated, the temperature was increased to maintain the desired octane number. A portion of the test results is recorded in FIG. 5. The data clearly demonstrate that the platinum-iridium-alumina catalyst has activity and activity maintenance markedly superior to that of widely used platinum and platinum-rhenium catalysts.

Example 10

A catalyst containing 0.5 wt. % platinum and 0.5 wt. % iridium on alumina was prepared by coimpregnating eta alumina (identified here as Alumina A) with an aqueous solution of chloroplatinic acid ($H_2PtCl_6$) and iridium tribromide tetrahydrate ($IrBr_3.4H_2O$). The solution contained 0.016 gm. of $H_2PtCl_6$ and 0.020 gm. of $IrBr_3.4H_2O$ per milliliter of solution. The amount of impregnating solution used was approximately 0.65 milliliter per gram of alumina. The eta alumina was prepared by calcining beta alumina trihydrate at 1100°F. for 4 hours. The surface area of the eta alumina was approximately 300 m²/gm. After impregnation of the alumina with the active catalytic components, the resulting material was dried at 230°F. The catalyst was not contacted with oxygen at elevated temperature.

Example 11

The catalyst of Example 10 was tested for the reforming of n-heptane. Approximately 3.0 grams of the catalyst was charged in the form of 10 – 20 mesh granules to an electrically heated steel tubular reactor approximately 0.5 inch in diameter. The catalyst was reduced in place in the reactor in downflowing hydrogen for 2 hours at 900°F. prior to the reforming run. The n-heptane (passed downflow) weight hourly space velocity (grams of n-heptane feed per hour per gram of catalyst) was 20, and the hydrogen to n-heptane mole ratio was 5/1. The reaction temperature and pressure were maintained at about 850°F. and 200 psig, respectively. After 30 minutes on stream, the n-heptane conversion was 83.5%, and the selectivity to aromatics (toluene + benzene) was 15.4%.

Example 12

The catalyst of Example 10 was reduced in hydrogen for 2 hours at 1472°F., and then purged with helium. It was then calcined in air for 2 hours at 1600°F. thereby converting the iridium in the catalyst to an oxide form. The catalyst was then tested for its activity in n-heptane reforming at the same conditions employed in Example 11. As in Example 11, the catalyst was reduced in place in the reactor in flowing hydrogen for 2 hours at 900°F. prior to the run. After 15 minutes on stream, the n-heptane conversion was 23%, and the selectivity of aromatics (toluene + benzene) was 9.6%. After 60 minutes on stream, the conversion was 20.7%, and the selectivity to aromatics was 7.0%. Clearly, the calcination of the platinum-iridium catalyst in air decreased very markedly the activity and selectivity of the catalyst, as can be seen by comparing the data of Examples 11 and 12.

Example 13

A catalyst containing 0.3 wt. % platinum and 0.3 wt. % iridium on alumina was prepared by the method of Example 8, except that a different alumina (identified as Alumina E) was used. Alumina E is also a gamma alumina with an approximate surface area of 180 m²/gm. Alumina E and Alumina C were obtained from different sources and may not be identical in all respects.

Example 14

A second platinum-iridium-alumina catalyst containing 0.2 wt. % platinum and 0.1 wt. % iridium was prepared by the method of Example 8 using Alumina C.

This catalyst was then used for the reforming of a 210° – 340°F. boiling range mixed naphtha containing approximately 43 volume % naphthenes, 45 volume % paraffins, and the remainder aromatics.

The reactor system used consisting of an elongated steel tube of approximately one inch inside diameter and having a capacity of about 500 cubic centimeters. The reaction tube is positioned within a fluidized sand constant temperature heating bath. In each catalyst test, approximately 150 grams of catalyst diluted with low surface area ceramic beads to a volume of about 500 cubic centimeters was charged to the reactor. The naphtha feed stock and hydrogen were preheated to nominal reaction temperature (sand bath temperature) and passed upflow over the fixed catalyst bed.

The weight hourly space velocity of the naphtha was 3, and the hydrogen rate was 5000 standard cubic feet per barrel of naphtha. The reactor pressure was maintained at 200 psig. The temperature of the fluidized sand heating bath surrounding the reactor was selected to give a C₅+ reformate with a research clear octane number of 100. As the catalyst deactivated, the temperature was increased to maintain the desired octane number.

The activity maintenance characteristics of the catalyst containing only 0.1 wt. % iridium are markedly inferior to those of the catalyst containing 0.3 wt. % iridium in Example 9, since a sand bath temperature of about 980°F. is required after only 500 hours on stream. Accordingly, the low iridium content catalyst would have to be regenerated much more frequently than the catalyst containing 0.3 wt. % iridium.

Example 15

Two additional platinum-iridium-alumina catalysts containing 0.3 wt. % iridium and 0.3 wt. % platinum were prepared by the method of Example 8 using Alumina C, except that they were calcined in air at temperatures of 800° and 1100°F. instead of 500°F. The metal surface areas of these catalysts and of the catalyst of Example 8 were then determined by the carbon monoxide chemisorption method described by Sinfelt and Yates, *J. Catalysis*, 8, 82 – 90 (1967). Naphtha reforming data were also obtained on the catalysts calcined at 500° and 1100°F., using the reactor equipment of Example 11 and the same naphtha feed employed in Example 14 at a weight hourly space velocity of 20, with a hydrogen to hydrocarbon mole ratio of 5/1, at a pressure and temperature of 200 psig and 940°F. Data are summarized in the following table:

| Calcination Temperature, °F. | 500 | 800 | 1100 |
|---|---|---|---|
| Metal surface area, square meters per gram of metal | 235 | 235 | 88 |
| Research clear octane number* | 99.1 | — | 96.8 |

*Data obtained after 100 minutes on stream.

The data indicate that calcination in air at a temperature above about 800°F. gives a lower metal surface area and a lower catalyst activity for naphtha reforming.

Example 16

A platinum-iridium-alumina catalyst containing 0.3 wt. % platinum and 0.3 wt. % iridium was prepared by sequential impregnation rather than coimpregnation. Alumina E was first impregnated with chloroiridic acid solution using 1.5 milliliters of solution per gram of alumina. The alumina was kept in contact with the impregnating solution overnight, after which it was dried at 230°F. The dried material was then contacted with chloroplatinic acid solution for 6 hours and dried again at 230°F. The catalyst was then reduced in flowing hydrogen at 932°F. The metal surface area was determined by carbon monoxide chemisorption and compared with the metal surface area of the catalyst of Example 13:

| Catalyst | Metal Surface Area, m²/gm |
|---|---|
| Sequentially impregnated Pt-Ir | 160 |
| Coimpregnated Pt-Ir | 235 |

The coimpregnated platinum-iridium catalyst has a significantly higher metal surface area than the sequentially impregnated platinum-iridium catalyst. Since reforming catalyst activity is directly related to the metals surface area of the catalyst, use of the coimpregnation method will lead to obtaining improved catalysts.

Example 17

Two platinum-iridium-silica catalysts containing 0.6 wt. % platinum and 0.1 wt. % iridium were prepared using Davison 922 silica gel as the support. The first catalyst was prepared by coimpregnation of the active components on the silica from a solution of chloroplatinic and chloroiridic acids. The second catalyst was prepared by sequential impregnation of the active components, the silica being impregnated first with chloroplatinic acid, then dried at 230°F., followed by impregnation with chloroiridic acid, a second drying at 230°F. and a final calcination at 850°F. The catalysts were then evaluated for the reforming of n-heptane utilizing the Example 11 apparatus at 1 atm. pressure, 925°F., a hydrogen to n-heptane mole ratio of 5/1, and a weight hourly space velocity of 5. Comparative data are shown in the following table:

| Catalyst | % Conversion of nC₇* | % Selectivity to Benzene and Toluene* |
|---|---|---|
| Sequentially impregnated Pt-Ir | 48.4 | 53.4 |
| Coimpregnated Pt-Ir | 60.8 | 61.0 |

*Data obtained after 2 hours on stream.

The coimpregnated catalyst is more active than the sequentially impregnated catalyst, and more selective for aromatics formation.

Example 18

Two iridium-gold-alumina catalysts were prepared by coimpregnating alumina with an aqueous solution of chloroiridic acid and HAuCl₄.3H₂O. Prior to impregnation, the alumina (an eta alumina) was heated at 1600°F. for 24 hours. The surface area of the alumina after this treatment was approximately 80 m²/gm. Approximately 0.65 milliliter of impregnating solution was employed per gram of alumina. The impregnated alumina was then dried at 230°F. Part of this material was calcined in air for 1 hour at 1000°F., while the remainder was not calcined at all. Both the calcined and non-calcined materials were then pelleted to form ⅛ inch cylinders. The two catalysts were then compared for the reforming of a 200° – 325°°F. mixed Louisiana naphtha in the Example 11 apparatus at a weight hourly space velocity of 6, a hydrogen to hydrocarbon mole ratio of 5/1, and at a temperature and pressure of 940 F. and 200 psig, respectively. Data are shown in the following table:

| Catalyst | Average Research Clear Octane Number* |
|---|---|
| Ir-Au non-calcined | 98.8 |
| Ir-Au calcined | 90.5 |

*During the three hour period from hour 1 to hour 4 on stream.

Calcination of the Ir-Au catalyst in air at 1000°F. clearly decreases the reforming activity.

The inventor is grateful to Dr. Grayson Via and Dr. Robert L. Garten for their highly valuable collaboration in obtaining, respectively, the X-ray diffraction and Mössbauer spectroscopy data presented in the examples.

What is claimed is:

1. A catalyst composition comprising:
   polymetallic clusters of iridium and at least one additional metal selected from the group consisting of ruthenium, rhodium, palladium, osmium, platinum, copper, silver, gold and mixtures thereof, dispersed on a refractory support,
   the iridium being present in the overall catalyst composition in an amount greater than 0.1 wt. %, each additional metal being present in an amount of 0.1 to 1.0 wt. %,
   the metal dispersion, defined as the percentage of metal atoms in the clusters which are present on the surface, being greater than about 20%,
   the average atomic ratio of iridium to each additional metal in the overall catalyst varying from about 1 : 10 to 10 : 1,
   the metallic atoms within a cluster being separated by distances of about 2.5 to 4.0A, and
   the degree of coverage of the surface of the refractory support by the polymetallic clusters being less than about 10%.

2. The catalyst composition of claim 1 wherein the sulfur content is characterized as less than about two atoms of sulfur per atom of iridium and additional metal and the composition is substantially free of alkali and alkaline earth metal constituents.

3. The catalyst composition of claim 1 wherein the polymetallic cluster comprises platinum and iridium.

4. The catalyst composition of claim 1 wherein the polymetallic cluster comprises gold and iridium.

5. The catalyst composition of claim 1 which additionally contains a halogen moiety in an amount of from about 0.1 to 3.0 wt. %, based on total catalyst.

6. The catalyst composition of claim 5 wherein the halogen moiety is a chlorine moiety, a fluorine moiety, or mixtures thereof.

7. The catalyst composition of claim 1 wherein the refractory support is an inorganic oxide.

8. The catalyst composition of claim 7 wherein the inorganic oxide is alumina.

9. The catalyst composition of claim 1 wherein the iridium and the additional metal are present on the support in an atomic ratio varying from about 1 : 3 to 3 : 1.

10. The catalyst composition of claim 1 wherein the metal dispersion is at least about 75%.

11. The catalyst composition of claim 1 wherein the metal dispersion is at least about 85%.

12. A catalyst composition comprising:
    polymetallic clusters of iridium and platinum dispersed on an inorganic oxide support,
    the iridium being present in the overall catalyst composition in an amount greater than 0.1 wt. %, the platinum being present in an amount of about 0.1 to 1 wt. %,
    the metal dispersion, defined as the percentage of metal atoms in the clusters which are present on the surface, being greater than about 75%,
    the average atomic ratio of iridium to platinum in the overall catalyst varying from about 1:10 to 10:1,
    the metallic atoms within a cluster being separated by distances of about 2.5 to 4.0 A, and
    the degree of coverage of the surface of the refractory support by the polymetallic clusters being less than about 10%.

13. The catalyst composition of claim 12 wherein the sulfur content is characterized as less than about two atoms of sulfur per atom of iridium and platinum and the composition is substantially free of alkali and alkaline earth metal constituents.

14. The catalyst composition of claim 12 which additionally contains a halogen moiety in an amount of from about 0.1 to 3.0 weight %, based on total catalyst.

15. The catalyst composition of claim 14 wherein the halogen moiety is a chlorine moiety.

16. The catalyst composition of claim 12 wherein the inorganic oxide is alumina.

17. The catalyst composition of claim 12 wherein the iridium and the platinum are present on the support in an atomic ratio varying from about 1:3 to 3:1.

18. The catalyst composition of claim 12 wherein the metal dispersion is at least about 85%.

19. The catalyst composition of claim 12 wherein the iridium is present in the overall catalyst composition in an amount of about 0.15 wt. % to 0.5 wt. %.

* * * * *